United States Patent [19]
Glover

[11] Patent Number: 5,962,555
[45] Date of Patent: Oct. 5, 1999

[54] ASA SIZING EMULSIONS CONTAINING LOW AND HIGH MOLECULAR WEIGHT CATIONIC POLYMERS

[75] Inventor: Daniel E. Glover, Brighton, Tenn.

[73] Assignee: Buckman Laboratories International, Inc., Memphis, Tenn.

[21] Appl. No.: 08/882,573

[22] Filed: Jun. 25, 1997

Related U.S. Application Data

[60] Provisional application No. 60/022,013, Jun. 25, 1996.

[51] Int. Cl.⁶ .............................. C08K 3/20; C08L 63/02
[52] U.S. Cl. .................... 523/411; 162/164.1; 162/164.3
[58] Field of Search ............................. 162/164.1, 164.3, 162/164.6; 523/411

[56] References Cited

U.S. PATENT DOCUMENTS

| | | | |
|---|---|---|---|
| 3,102,064 | 8/1963 | Wurzburg et al. | 162/158 |
| 3,778,476 | 12/1973 | Rembaum et al. | 260/567.6 P |
| 3,821,069 | 6/1974 | Wurzburg | 162/158 |
| 3,874,870 | 4/1975 | Green et al. | 71/67 |
| 3,931,319 | 1/1976 | Green et al. | 260/567.6 P |
| 3,968,005 | 7/1976 | Wurzburg | 162/158 |
| 4,025,627 | 5/1977 | Green et al. | 424/248.4 |
| 4,027,020 | 5/1977 | Green et al. | 424/248.56 |
| 4,029,885 | 6/1977 | Buikema | 536/50 |
| 4,040,900 | 8/1977 | Mazzarella et al. | 162/158 |
| 4,089,977 | 5/1978 | Green et al. | 424/329 |
| 4,111,679 | 9/1978 | Shair et al. | 71/67 |
| 4,147,586 | 4/1979 | Petrovich et al. | 162/135 |
| 4,166,894 | 9/1979 | Schaper | 528/271 |
| 4,181,566 | 1/1980 | Vaughn et al. | 162/164 EP |
| 4,198,269 | 4/1980 | Evani et al. | 162/164 EP |
| 4,218,286 | 8/1980 | Jones et al. | 162/164 R |
| 4,222,820 | 9/1980 | Hiskens et al. | 162/158 |
| 4,268,352 | 5/1981 | Cosper et al. | 162/191 |
| 4,347,100 | 8/1982 | Brucato | 162/10 |
| 4,506,081 | 3/1985 | Fenyes et al. | 548/523 |
| 4,514,229 | 4/1985 | Sato et al. | 106/135 |
| 4,522,686 | 6/1985 | Dumas | 162/158 |
| 4,529,447 | 7/1985 | Okada et al. | 106/287.24 |
| 4,581,058 | 4/1986 | Fenyes et al. | 71/67 |
| 4,606,773 | 8/1986 | Novak | 106/213 |
| 4,657,946 | 4/1987 | Rende et al. | 523/402 |
| 4,778,813 | 10/1988 | Fenyes et al. | 514/357 |
| 4,970,211 | 11/1990 | Fenyes et al. | 514/252 |
| 5,051,124 | 9/1991 | Pera | 71/67 |
| 5,093,078 | 3/1992 | Hollis et al. | 422/16 |
| 5,223,097 | 6/1993 | Hassler | 162/161 |
| 5,419,897 | 5/1995 | Drake et al. | 424/78.1 |
| 5,626,720 | 5/1997 | Hassler | 162/161 |

FOREIGN PATENT DOCUMENTS

| | | |
|---|---|---|
| 954526 | 4/1964 | United Kingdom . |
| 2 137 613 | 10/1984 | United Kingdom . |
| 2137613 | 10/1984 | United Kingdom . |
| 2 160 538 | 12/1985 | United Kingdom . |
| 2160538 | 12/1985 | United Kingdom . |

*Primary Examiner*—Melvyn I Marquis
*Assistant Examiner*—D. Aylward
*Attorney, Agent, or Firm*—Morgan, Lewis & Bockus LLP

[57] ABSTRACT

ASA sizing emulsions containing low and high molecular weight cationic polymers are described. An ASA sizing emulsion of the invention contains 25 to 99 percent by weight water, 0.003 to 60 percent by weight ASA, 0.003 to 50 percent by weight of a cationic polymer mixture, and 0 to 2 percent by weight of a surfactant. The cationic polymer mixture contains 75 to 99 percent by weight of an ionene polymer and 1 to 25 percent by weight of a high molecular weight polyethyleneimine polymer. In the sizing emulsion, the ASA has a particle size ranging from 0.5 to 3 microns. A method for sizing paper using such an emulsion is also described.

21 Claims, 1 Drawing Sheet

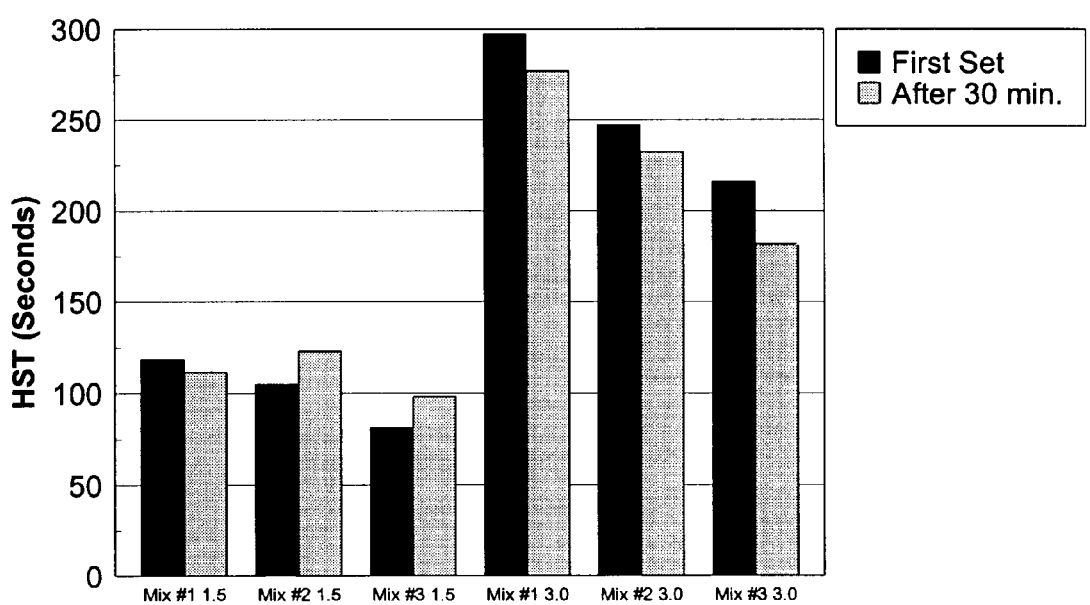
Figure 1: Results from Hercules Size Test (HST) performed on handsheets.

ASA SIZING EMULSIONS CONTAINING LOW AND HIGH MOLECULAR WEIGHT CATIONIC POLYMERS This Application claims the benefit of U.S. Provisional Application 60/022013 filed Jun. 25, 1996.

FIELD OF THE INVENTION

The present invention relates to emulsions of alkenyl succinic anhydrides (ASA) and their use to size paper. More particularly, the invention relates to an ASA sizing emulsion containing low molecular weight and high molecular weight cationic polymers and the use of such an emulsion to size paper.

BACKGROUND OF THE INVENTION

The use of ASA emulsions to size paper has been described in U.S. Pat. Nos. 3,102,064; 3,821,069; 3,968,005; and 4,040,900. Though they have been widely used in the papermaking industry, ASA sizing emulsions have some drawbacks. For example, ASA materials are not water soluble and, therefore, must be uniformly suspended in paper pulp to permit sufficient contact with the pulp fibers to achieve the desired sizing effect on the final paper product. ASA must be emulsified before use as a sizing agent because it is an oil based material. Various cationic agents have been employed to address this drawback and obtain more efficient sizing. U.S. Pat. No. 4,657,946 discloses the use of cationically charged water-soluble vinyl addition and condensation polymers to provide improved emulsification of ASA sizing agents. U.S. Pat. No. 4,606,773 describes ASA sizing emulsions using a cationic water-soluble polymer and a cationic starch as an emulsifier. The polymer is used, in an aqueous system, to help disperse the ASA droplets in an emulsion, and keep them from coagulating together, and forming much larger droplets. With the increasing use of ASA sizing emulsions, there remains a need for improved ASA sizing emulsions which disperse the ASA within the pulp and allow for retention of the ASA size on the pulp fiber.

BRIEF DESCRIPTION OF THE DRAWINGS

FIG. 1 depicts the results from a Hercules Size Test using an ASA sizing emulsion having a mixture of cationic polymers according to the invention.

SUMMARY OF THE INVENTION

The invention answers the need for improved ASA sizing emulsions by providing an ASA sizing emulsion which disperses well and gives efficient sizing of the finished paper product. Additionally, the invention provides a method of sizing paper using an ASA sizing emulsion of the invention.

More specifically, the invention provides an ASA sizing emulsion comprising water, ASA, a cationic polymer mixture, and optionally, a surfactant. The cationic polymer mixture contains a low molecular weight ionene polymer and a high molecular weight cationic polymer.

DETAILED DESCRIPTION OF THE INVENTION

The invention provides an ASA sizing emulsion which disperses well and gives efficient sizing of the finished paper product. An ASA sizing emulsion of the invention contains 25 to 99 weight percent water, 0.003 to 60 weight percent ASA, 0.003 to 50 weight percent of a mixture of a low molecular weight cationic polymer and a high molecular weight cationic polymer, and 0 to 2 percent by weight of a surfactant. An ASA sizing emulsion of the invention is particularly well suited for use as an internal size in papermaking. Such a water-based sizing emulsion may contain solids (e.g., ASA and cationic polymer mixture) ranging from levels as low as 1 percent by weight and to levels as high as 75 percent by weight. Emulsions having about 50 percent by weight are preferred. In the ASA sizing emulsion, the ASA has a particle size ranging from about 0.5 to 3 microns. Preferably, the particle size ranges from 0.8 to 2.5 microns and more preferably is about 1 micron.

ASA material, as is known in the art, represent a class of chemical compounds having the following general formula: $R^1$—R—C(O)—O—C(O). In the general formula R is a dimethylenyl or trimethylenyl group and $R^1$ is a hydrophobic group having five or more carbon atoms. $R^1$ may be, for example, an alkyl, alkenyl, aralkyl, or arakenyl group. However, any ASA material may be used in an ASA sizing emulsion according to the invention. Sources of ASA include, for example, Albermarle Corporation, Baton Rouge, La. and Dixie Chemical Company, Houston, Tex.

In an ASA sizing emulsion of the invention, the ASA may be present from 0.003 to 60 weight percent. More preferably, the ASA is present 10 to 50 weight percent and more preferably from 25 to 40 weight percent. The weight ratio of ASA to cationic polymer in an emulsion of the invention may range from 0.5:1 up to 4:1 on a solids basis. Preferably the weight ratio of ASA to cationic polymer is about 2:1.

The cationic polymer component of an ASA sizing emulsion of the invention is a mixture of a water-soluble ionene polymer having a weight average molecular weight below 15,000 and a water-soluble polyethylenimine (PEI) having a weight average molecular weight greater than 500,000, preferably greater than 1,000,000. The cationic polymer mixture may be present in the emulsion in amounts ranging from 0.003 to 50 weight percent. Preferably, the cationic polymer mixture is present in amounts from 10 to 35 weight percent, and more preferably from 15 to 25 weight percent. Within the polymer mixture, the ionene polymer is present from 75 to 99 weight percent on a dry polymer basis and the PEI from 1 to 25 weight percent on a dry polymer basis. The polymer mixture preferably comprises 92.5 to 97.5 weight percent on a dry polymer basis of the ionene polymer and 2.5 to 7.5 weight percent on a dry polymer basis PEI.

Any low molecular weight ionene polymer or mixture of such ionene polymers may be used to practice this invention. Ionene polymers have often been used to as microbicides to control or prevent biological fouling in aqueous systems. Advantageously, in addition to improving its sizing efficiency, the ionene polymers can impart their biocidal properties to an ASA sizing emulsion of the invention.

Ionene polymers may be classified according to the repeating unit found in the polymer. The repeating unit results from the reactants used to make the ionene polymer. Ionene polymers or polymeric quaternary ammonium compounds (i.e., polymers having quaternary nitrogens in the polymer backbone) belong to a well-known class of compounds. Ionene polymers, their preparation and biocidal activity, are disclosed, for example, in U.S. Pat. Nos. 3,874,870; 3,931,319; 4,027,020; 4,089,977; 4,111,679; 4,506,081; 4,181,058; 4,778,813; 4,970,211; 5,051,124; 5,093,078; and 5,419,897, which are incorporated here by reference. Preferably, the low molecular weight ionene polymer is a linear polymer. The ionene polymer has a weight average molecular weight of less than 15,000, preferably less than 10,000, and more preferably has a weight average molecular weight ranging from 5,000 to 8,500. The ionene polymer has a charge density at pH 7 of greater than 5 meq/g, preferably ranging from 5 to 10 meq/g, and most preferably 6–7 meq/g.

A first preferred type of ionene polymer comprises the repeating unit of formula I:

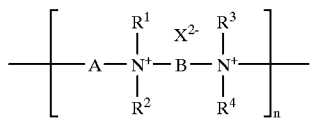

(I)

In this formula, $R^1$, $R^2$, $R^3$, and $R^4$ can be identical or different, and are selected from H, $C_1$–$C_{20}$ alkyl optionally substituted with at least one hydroxyl group, and benzyl optionally substituted on the benzene moiety with at least one $C_1$–$C_{20}$ alkyl group. Preferably, $R^1$, $R^2$, $R^3$ and $R^4$ are all methyl or ethyl.

The group "A" is a divalent radical selected from $C_1$–$C_{10}$ alkylene, $C_2$–$C_{10}$ alkenylene, $C_2$–$C_{10}$ alkynylene, $C_1$–$C_{10}$ hydroxyalkylene, symmetric or asymmetric di-$C_1$–$C_{10}$-alkylenether, arylene, arylene-$C_1$–$C_{10}$-alkylene, or $C_1$–$C_{10}$-alkylenearyl-$C_1$–$C_{10}$ alkylene. Preferably, "A" is a divalent $C_1$–$C_5$ alkylene, $C_2$–$C_5$ alkenylene, $C_2$–$C_5$ hydroxyalkylene, or symmetric di-$C_2$–$C_5$-alkylenether, and most preferably "A" is —$CH_2CH_2CH_2$—, —$CH_2CH(OH)CH_2$— or —$CH_2CH_2OCH_2CH_2$—.

The group "B" is a divalent radical selected from $C_1$–$C_{10}$ alkylene, $C_2$–$C_{10}$ alkenylene, $C_2$–$C_{10}$ alkynylene, $C_1$–$C_{10}$ hydroxyalkylene, arylene, arylene-$C_1$–$C_{10}$ -alkylene, or $C_1$–$C_{10}$-alkylenearyl-$C_1$–$C_{10}$-alkylene. Preferably, "B" is $C_1$–$C_5$ alkylene, $C_2$–$C_5$ alkenylene, $C_2$–$C_5$ hydroxyalkylene, arylene, arylene-$C_1$–$C_5$-alkylene, or $C_1$–$C_5$ alkylenearyl-$C_1$–$C_5$-alkylene. Most preferably "B" is —$CH_2CH_2$—, —$CH_2CH_2CH_2$—, —$CH_2CH_2CH_2CH_2$—, or —$CH_2(CH_2)_4CH_2$—.

The counter ion, $X^{2-}$, is a divalent counter ion, two monovalent counter ions, or a fraction of a polyvalent counter ion sufficient to balance the cationic charge in the repeating unit which forms the ionene polymer backbone. Preferably, $X^{2-}$ is two monovalent anions selected from a halide anion and a trihalide anion and more preferably, chloride or bromide. Ionene polymers having trihalide counter ions are described in U.S. Pat. No. 3,778,476, the disclosure of which is incorporated here by reference.

The ionene polymers having the repeating unit of formula I may be prepared by a number of known methods. One method is to react a diamine of the formula $R^1R^2N$—B—$NR^1R^2$ with a dihalide of the formula X-A-X. Ionene polymers having this repeating unit and methods for their preparation are described, for example, in U.S. Pat. Nos. 3,874,870, 3,931,319, 4,025,627, 4,027,020, 4,506,081 and 5,093,078, the disclosures of which are incorporated here by reference. Among the ionene polymers with a repeating unit of formula I, a particularly preferred ionene polymer is poly[oxyethylene-(dimethyliminio)ethylene (dimethyliminio)ethylene dichloride. In this ionene polymer of formula I, $R^1$, $R^2$, $R^3$ and $R^4$ are each methyl, A is —$CH_2CH_2OCH_2CH_2$—, B is —$CH_2CH_2$—, and $X^{2-}$ is 2 $Cl^-$, and the average molecular weight is 1,000–5,000. This ionene polymer is available from Buckman Laboratories, Inc. of Memphis, Tenn. as Busan® 77 product or WSCP® product, which are each 60% aqueous dispersions of the polymer.

Another particularly preferred ionene polymer having a repeating unit of formula I is the ionene polymer where $R^1$, $R^2$, $R^3$ and $R^4$ are each methyl, A is —$CH_2CH(OH)CH_2$—, B is —$CH_2CH_2$—, and $X^{2-}$ is 2 $Cl^-$. This ionene polymer is a reaction product of N,N,N',N'-tetramethyl-1,2-ethanediamine with (chloromethyl)-oxirane, and has a weight average molecular weight of 1,000–5,000. The polymer is available from Buckman Laboratories, Inc. as Busan® 79 product and WSCP® II product, which are each 60% aqueous solutions of the polymer.

A second type of ionene polymer comprises the repeating unit of formula II:

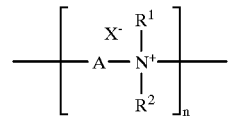

(II)

In formula II, the definitions of $R^1$, $R^2$, and A are the same as those defined above for formula I. $X^-$ is a monovalent counter ion, one half of a divalent counter ion, or a fraction of a polyvalent counter ion sufficient to balance the cationic charge of the repeating unit which forms the ionene polymer. $X^-$ may be, for example, a halide or trihalide anion, and $X^-$ is preferably chloride or bromide.

The ionene polymers having the repeating unit of formula II may be prepared by known methods. One method is to react an amine of the formula $R^1R^2NH$ with a haloepoxide such as epichlorohydrin. Ionene polymers having the repeating unit of formula II are described, for example, in U.S. Pat. Nos. 4,111,679 and 5,051,124, the disclosures of which are incorporated here by reference.

Preferred ionene polymers having the repeating unit of formula II are those where $R^1$ and $R^2$ are each methyl, A is —$CH_2CH(OH)CH_2$—, and $X^-$ is $Cl^-$. This polymer is obtained as a reaction product of N-dimethylamine with (chloromethyl)oxirane, and has a weight average molecular weight of 2,000–10,000. The polymer is available from Buckman Laboratories, Inc. as the Busan® 1055 product, a 50% aqueous dispersion of the polymer.

Another preferred ionene polymer having the repeating unit of formula II is obtained as a reaction product of dimethylamine with epichlorohydrin, where $R^1$ and $R^2$ are each methyl, A is —$CH_2CH(OH)CH_2$— and $X^-$ is $Cl^-$. This ionene polymer has a 5,000–10,000 average molecular weight, and is available from Buckman Laboratories, Inc. in a 50% aqueous solution as the Busan® 1055 product.

A third type of ionene polymer comprises a repeating unit of formula III:

(III)

wherein R is

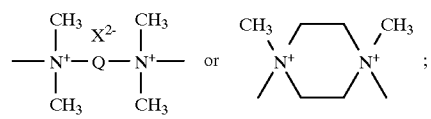

The group Q is —$(CHR')_p$—, —$CH_2$—$CH=CH$—$CH_2$—, —$CH_2$—$CH_2$—$O$—$CH_2$—$CH_2$—, —$CH_2$—$CH(OH)$—$CH_2$—, or —$(CHR')_n$—$NH$—$C(O)$—$NH$ (CHR')$_n$—. The group B' is {—[CH$_2$—CH(OH)—CH$_2$—N$^+$R'$_2$—(CHR')$_n$—NH—C(O)—NH]—, X$^-$ } or {—[(CHR')$_n$—N$^+$R'$_2$—CH$_2$—CH(OH)—CH$_2$]—, X$^-$}. The variables n and p independently vary from 2 to 12. Each R' is independently hydrogen or a lower alkyl group. X$^{2-}$ is a divalent counter ion, two monovalent counter ions, or a fraction of a polyvalent counter ion sufficient to balance the cationic charge in the group R. X$^-$ is a monovalent counter ion, one half of a divalent counter ion or a fraction of a polyvalent counter ion sufficient to balance the cationic charge in the group B'. Preferably, R' is hydrogen or C$_1$–C$_4$ alkyl, n is 2–6, and p is 2–6. Most preferably, R' is hydrogen or methyl, n is 3 and p is 2. Preferred counter ions for X$^{2-}$ and X$^-$ are the same as those discussed above for formulae I and II.

The polymers of formula III are derived by known methods from bis-(dialkylaminoalkyl) ureas, which are also known as urea diamines. Ionene polymers of the formula III and methods of their preparation are described in U.S. Pat. No. 4,506,081, the disclosure of which is incorporated here by reference.

Preferred ionene polymers having the repeating unit of formula III are those where R is urea diamine and B' is CH$_2$CH(OH)CH$_2$, and X$^-$ is Cl$^-$. Available from Buckman Laboratories, Inc., ASTAT product and BL® 1090 product are 50% aqueous dispersions of this ionene polymer. The ionene polymer is obtained as a reaction product of N,N'-bis-[1-(3-(dimethylamino)-propyl)] urea and epichlorohydrin, such ionene polymer having a weight average molecular weight of 2,000–15,000, preferably 3,000–7,000.

The ionene polymers comprising the repeating units of formulae I, II, or III may also be capped, i.e., have a specific end group. Capping may be achieved by means known in the art. For example, an excess of either reactant used to make the ionene polymer can be employed to provide a capping group. Alternatively, a calculated quantity of a monofunctional tertiary amine or monofunctional substituted or unsubstituted alkyl halide can be reacted with an ionene polymer to obtain a capped ionene polymer. Ionene polymers can be capped at one or both ends. Capped ionene polymers and their microbicidal properties are described in U.S. Pat. Nos. 3,931,319 and 5,093,078, the disclosures of which are incorporated here by reference.

A particularly preferred ionene polymer for the ASA sizing emulsion is the reaction product of epichlorohydrin and dimethylamine having a weight average molecular weight of about 8,000 and a charge density of about 6–7 meq/g at pH 7. This ionene polymer is available from Buckmnan Laboratories Incorporated, Memphis, Tenn. under the BUFLOC® 186 tradename. The BUFLOC® 186 product is a 60 percent by weight solution of that ionene polymer in water.

A poly(ethylenimine) (PEI) for use in the invention has a weight average molecular weight greater than 500,000, preferably greater than 1,000,000. Most preferably, the (PEI) has a weight average molecular weight of about 1,400,000. The PEI may be crosslinked or uncrosslinked. PEI compounds are commercially available from many sources and include POLYMIN poly(ethylenimine) and LUPASOL™ poly(ethylenimine) available from BASF Corporation. Suitable polyethyleneimines include, but are not limited too, POLYMIN P and POLYMIN PS from BASF Corporation. POLYMIN P and POLYMIN PS contain 1500 ethyleneimine moieties and have weight average molecular weights of about 750,000. A particularly preferred PEI is the BUFLOC® 595 product available from Buckman Laboratories Incorporated, Memphis, Tennessee. BUFLOC® 595 product is 25 percent by weight aqueous solution of PEI crosslinked with ethylene oxide which has a weight average molecular weight from 1,000,000 to 1,200,000 and a charge density of about 5 meq/g at pH 7 and 7 meq/g at pH 4.5.

An ASA sizing emulsion of the invention may also contain from 0 to 2.0 percent by weight of a surfactant. Preferably, the surfactant is present in about 1 percent by weight. The surfactant for the ASA sizing emulsion may be an anionic, cationic, nonionic, amphoteric and zwitterionic surfactant and mixtures thereof. Preferably, the surfactant is anionic or nonionic or a mixture thereof. Most preferably, the surfactant is an anionic surfactant. Exemplary surfactants which may be used in the ASA sizing emulsion are described in U.S. Pat. Nos. 4,040,900, 4,606,773, and 4,657,946, the disclosures of which are incorporated here by reference and in McCUTCHEON'S, DETERGENTS AND EMULSIFIERS, 1996 ANNUAL, published by Allured Publishing Corporation, which is incorporated here by reference.

Exemplary anionic surfactants include alkyl ether sulfates, alkyl ether carboxylates and alkyl ether phosphate esters. Most preferably, the anionic surfactant is an alkyl ether phosphate ester such as branched alcohol ethoxylate phosphate esters of the general formula RO(CH$_2$CH$_2$O)$_n$PO$_3$M$_2$. In the general formula, R is an alkyl or alkylaryl group, n is the number of moles of ethyleneoxide, and M is hydrogen, sodium, or another counter ion. Phosphate esters of this general formula may be obtained from Rhone Poulenc, Cranberry, N.J. under the RHODAFAC tradename, for example, RHODAFAC RS-610 product.

ASA sizing emulsions of the invention may be prepared using techniques known in the art. The emulsions may be made by mixing the various components described above and then emulsifying the mixture. The emulsions should preferably be used promptly after being prepared, as the sizing level may decrease with time.

To size paper using an ASA sizing emulsion, the emulsion is usually added before the paper sheet forming step in a papermaking process. The sizing emulsion may be added as far back in a papermaking process as the thick stock but is most often added just before the head box of a paper machine. As is known in the art, a sizing emulsion should be added in such a way to insure proper distribution on the fibers. To insure proper distribution, a sizing emulsion is commonly diluted to about 1–3% solids, then added before the screens or fan pump just prior to the pulp slurry entering the head box. This dilution, followed by dispersion by the screens and/or fan pump aids in distributing the sizing emulsion to achieve uniform distribution on the paper fibers.

The following examples illustrate the preparation and use of an ASA sizing emulsion according to the invention. The examples describe the preparation of hand sheets using a standard ASA sizing emulsion and ASA sizing emulsions of the invention.

EXAMPLE 1

This example demonstrates the preparation and use of an ASA sizing emulsion according to the invention. For comparison purposes, an ASA sizing emulsion as currently made in the papermaking art was used as a control. To measure sizing efficiency, the Hercules Size Test Ink #2 was employed. For these tests, a papermill's furnish of recycled old corrugated containers (OCC), diluted to 0.5% consistency, was used along with the mill's process water. A retention aid, BUFLOC® 590 product was used in this handsheet study. BUFLOC® 590 product is an emulsion polymer having a cationic acrylamide copolymer with cationized acrylate groups having a molecular weight greater than 10 million and is available from Buckman Laboratories, Inc., Memphis, Tenn. For this handsheet study, the oil-based BUFLOC® 590 product was let down in water with mixing and diluted to 0.1% solids before use.

ASA sizing emulsions were made by mixing the components listed in the table below to arrive at 1.25 weight percent active ASA. The mixture was emulsified for one minute using a high shear Ultra-turrax Type 45-58 emulsifier, manufactured by Janke and Kunkel Ika Labortechnik, and available from Tekmar Company, Cincinnati, Ohio.

The amounts of sizing and retention aid used were ASA 6 lb/ton, and BUFLOC® 590 2 lb/ton on 1.5 g hand sheets. Hand sheets were pressed once at 50 psi and dried at 250° F. for 8 minutes.

For the cationic polymer, the control used Nalco 7451 product, an acrylamidemethacrylate copolymer conventionally used with ASA sizing. Emulsions 2-4 used BUFLOC® 186 product as the ionene polymer and BUFLOC® 595 product as the PEI in the following amounts: 99 percent by weight and 1 percent by weight, 97.5 percent by weight and 2.5 percent by weight, and 92.5 percent by weight and 7.5 percent by weight, respectively. Table 1 shows the various ASA sizing emulsion composition and the hand sheet test results.

TABLE 1

| Emulsion | ASA | Polymer | Water | wt % ASA | HST |
| --- | --- | --- | --- | --- | --- |
| Control | 3.75 g | 2.7 g | 293.55 g | 1.25 | 269 |
| #2 | 3.75 g | 3.20 g | 293.05 g | 1.25 | 239 |
| #3 | 3.75 g | 3.20 g | 293.05 g | 1.25 | 300 |
| #4 | 3.75 g | 3.20 g | 293.05 g | 1.25 | 293 |

EXAMPLE 2

From a recycled corrugated container stock, three hand sheets, A, B, and C, were formed. The hand sheets were prepared according to the procedures as described in Example 1. A Hercules Size Test Ink #2 was performed twice on each hand sheet with the results of each test and the average of the two tests reported below in Table 2. The composition was the same as described in Example 1, except the cationic polymer mixture contained 97 percent by weight BUFLOC® 186 product as the ionene polymer and 3 percent by weight BUFLOC® 595 product as the high molecular weight PEI.

TABLE 2

| Hand Sheet | A | B | C | Average |
| --- | --- | --- | --- | --- |
| Weight (g) | 1.725 | 1.606 | 1.547 | 1.626 |
| #1 HST | 331.5 | 239.8 | 202.0 | 257.8 |
| #2 HST | 329.7 | 232.3 | 209.5 | 257.2 |
| Avg HST | 330.6 | 236.1 | 205.8 | 257.5 |

EXAMPLE 3

The hand sheets were prepared and evaluated using the same procedures as described in Example 2. A Hercules Size Test Ink #2 was performed twice on each hand sheet with the results of each test and the average of the two tests reported below in Table 3. The composition was the same as described in Example 1, except the cationic polymer mixture contained 97.5 percent by weight BUFLOC® 186 product as the ionene polymer and 2.5 percent by weight BUFLOC® 5558 product as the high molecular weight PEI.

TABLE 3

| Hand Sheet | A | B | C | Average |
| --- | --- | --- | --- | --- |
| Weight (g) | 1.725 | 1.609 | 1.604 | 1.646 |
| #1 HST | 313.4 | 191.9 | 176.1 | 227.1 |
| #2 HST | 232.0 | 175.6 | 164.0 | 190.5 |
| Avg. HST | 272.7 | 183.8 | 170.1 | 208.8 |

EXAMPLE 4

The hand sheets were prepared and evaluated using the same procedures as described in Example 2. A Hercules Size Test Ink #2 was performed twice on each hand sheet with the results of each test and the average of the two tests reported below in Table 4. The composition was the same as described in Example 1, except the cationic polymer mixture contained 90 percent by weight BUFLOC® 186 product as the ionene polymer and 10 percent by weight BUFLOC® 5558 product as the high molecular weight PEI.

TABLE 4

| Hand Sheet | A | B | C | Average |
| --- | --- | --- | --- | --- |
| Weight (g) | 1.542 | 1.773 | 1.595 | 1.623 |
| #1 HST | 292.1 | 220.2 | 158.1 | 223.5 |
| #2 HST | 295.6 | 209.2 | 156.2 | 220.3 |
| Avg. HST | 293.9 | 214.7 | 157.2 | 221.9 |

EXAMPLE 5

This example demonstrates various cationic polymer mixtures for use in an ASA sizing emulsion according to the invention. The cationic polymer mixtures used were mixtures of BUFLOC® 186 and BUFLOC® 595 containing (by weight) 97.5%, 95%, and 90% of BUFLOC® 186, respectively, with the balance being BUFLOC® 595. The mixtures are shown in Table 5.

TABLE 5

| Weights of polymers for the makeup of the ASA emulsion polymer | | |
| --- | --- | --- |
| Mixture | BUFLOC ® 186 (grams) | BUFLOC ® 595 (grams) |
| #1 | 3.12 | 0.08 |
| #2 | 3.04 | 0.16 |
| #3 | 2.88 | 0.32 |

The paper stock was prepared by mixing 1714 g of 3.5% consistency OCC stock to yield 60 g oven dried (OD) pulp. This paper stock was diluted to 0.5% consistency with the addition of 10,286 g of additional tap water (12 kg total), and allowed to mix thoroughly to break up any fibers clumps. For each batch of five 1.5 g handsheets, 1500 g of thin stock was needed.

The ASA emulsion (1.25% active ASA) was prepared by first weighing out 293.05 g of water in a 600 ml beaker. To the water, the required amounts of BUFLOC® 186 and BUFLOC® 595 were added. The water/polymer mixture was then stirred to dissolve the polymers into the water. To this water/polymer mixture 3.75 g of ASA was added. After adding the ASA the composition was mixed at high speed for 45 seconds to form an emulsion.

A flocculent was prepared by weighing 2 g of BUFLOC® 594 into 198 g water. This mixture was then emulsified by mixing in a Braun mixer for exactly 20 seconds. After standing for one hour, 20 g of the flocculent/water mixture were added to 180 g water, and mixed for 30–60 seconds to form a 0.1% mixture of flocculent in water.

The handsheets were prepared by weighing out 1500 of 0.5% consistency stock and stirring it in lab mixer. For 1.5 lb/ton ASA handsheets, 0.45 g of 1% ASA emulsion were added. For 3.0 lb/ton ASA handsheets, 0.90 g of 1% ASA emulsion were added. After adding the ASA emulsion, twenty seconds passed to allow for mixing. To this ASA handsheet, 7.5 g of the 0.1% flocculent in water (BUFLOC® 594, a cationic acrylamide emulsion polymer having a weight average molecular weight ranging from 5,000,000 to 7,000,000) were added. Thirty seconds were passed to allow for mixing. The handsheets were separated into 5 parts (300 g each) to make five 1.5 g handsheets. The handsheets were pressed once at 50 psi. Three of the five handsheets (A,B,C) were dried at 240° F. for 9 minutes, and allowed to equilibrate for at least 1 hour before running the HST size tests.

For each of ASA sizing emulsions containing cationic polymer mixtures 1, 2, and 3, handsheets were made with 1.5, and 3.0 lb/ton of ASA size added. After thirty minutes, another set of handsheets were made to demonstrate the stability of ASA sizing emulsions according to the invention. Typically, as emulsions age, the emulsion droplets began to group together, and form much larger droplets, lessening the sizing ability of the emulsion. Further, the ASA may itself hydrolyze. As the data below demonstrates, ASA sizing emulsions of the invention maintain good physical emulsion stability, good chemical stability and good sizing efficiency upon aging for thirty minutes. The results are shown in Tables 6 through 17.

TABLE 6

ASA Sizing Emulsion With Cationic Polymer Mixture 1

| Hand Sheet 1.5 lb ASA | A | B | C | Avg. HST |
|---|---|---|---|---|
| #1 HST | 129.1 | 146.3 | 87.0 | 120.8 |
| #2 HST | 136.5 | 129.2 | 83.6 | 116.4 |
| Avg. HST | 132.8 | 137.8 | 85.3 | 118.6 |

TABLE 7

ASA Sizing Emulsion With Cationic Polymer Mixture 1, After 30 Minutes

| Hand Sheet 1.5 lb ASA | A | B | C | Avg. HST |
|---|---|---|---|---|
| #1 HST | 102.9 | 131.0 | 120.2 | 118.0 |
| #2 HST | 82.4 | 117.0 | 117.5 | 105.6 |
| Avg. HST | 92.7 | 124.0 | 118.9 | 111.8 |

TABLE 8

ASA Sizing Emulsion With Cationic Polymer Mixture 1

| Hand Sheet 3.0 lb ASA | A | B | C | Avg. HST |
|---|---|---|---|---|
| #1 HST | 313.2 | 326.0 | 262.1 | 300.4 |
| #2 HST | 293.0 | 336.8 | 253.1 | 294.3 |
| Avg. HST | 303.1 | 331.4 | 257.6 | 297.4 |

TABLE 9

ASA Sizing Emulsion With Cationic Polymer Mixture 1, After 30 Minutes

| Hand Sheet 3.0 lb ASA | A | B | C | Avg. HST |
|---|---|---|---|---|
| #1 HST | 245.7 | 252.4 | 328.0 | 275.4 |
| #2 HST | 244.3 | 257.9 | 334.8 | 279.0 |
| Avg. HST | 245.0 | 255.2 | 331.4 | 277.2 |

TABLE 10

ASA Sizing Emulsion With Cationic Polymer Mixture 2

| Hand Sheet 1.5 lb ASA | A | B | C | Avg. HST |
|---|---|---|---|---|
| #1 HST | 128.1 | 107.3 | 99.5 | 111.6 |
| #2 HST | 100.8 | 104.6 | 88.4 | 97.9 |
| Avg. HST | 114.5 | 106.0 | 94.0 | 104.8 |

TABLE 11

ASA Sizing Emulsion With Cationic Polymer Mixture 2, After 30 Minutes

| Hand Sheet 1.5 lb ASA | A | B | C | Avg. HST |
|---|---|---|---|---|
| #1 HST | 106.9 | 68.6 | 198.0 | 124.5 |
| #2 HST | 95.7 | 75.0 | 195.5 | 122.1 |
| Avg. HST | 101.3 | 71.8 | 196.8 | 123.3 |

TABLE 12

ASA Sizing Emulsion With Cationic Polymer Mixture 2

| Hand Sheet 3.0 lb ASA | A | B | C | Avg. HST |
|---|---|---|---|---|
| #1 HST | 272.5 | 222.5 | 244.0 | 247.3 |
| #2 HST | 275.6 | 227.8 | 237.9 | 247.1 |
| Avg. HST | 247.1 | 226.7 | 241.0 | 247.2 |

TABLE 13

ASA Sizing Emulsion With Cationic Polymer Mixture 2, After 30 Minutes

| Hand Sheet 3.0 lb ASA | A | B | C | Avg. HST |
|---|---|---|---|---|
| #1 HST | 257.2 | 228.8 | 221.0 | 234.3 |
| #2 HST | 257.0 | 200.7 | 234.0 | 230.6 |
| Avg. HST | 257.1 | 212.8 | 227.5 | 232.5 |

TABLE 14

ASA Sizing Emulsion With Cationic Polymer Mixture 3

| Hand Sheet 1.5 lb ASA | A | B | C | Avg. HST |
|---|---|---|---|---|
| #1 HST | 101.3 | 67.0 | 77.9 | 82.1 |
| #2 HST | 80.7 | 91.3 | 70.2 | 80.7 |
| Avg. HST | 91.0 | 79.2 | 74.1 | 81.4 |

TABLE 15

ASA Sizing Emulsion With Cationic Polymer Mixture 3, After 30 Minutes

| Hand Sheet 1.5 lb ASA | A | B | C | Avg. HST |
|---|---|---|---|---|
| #1 HST | 176.8 | 80.7 | 53.8 | 103.8 |
| #2 HST | 148.0 | 88.1 | 43.4 | 93.2 |
| Avg. HST | 162.4 | 84.4 | 48.6 | 98.5 |

TABLE 16

ASA Sizing Emulsion With Cationic Polymer Mixture 3

| Hand Sheet 3.0 lb ASA | A | B | C | Avg. HST |
|---|---|---|---|---|
| #1 HST | 209.0 | 203.6 | 229.5 | 214.0 |
| #2 HST | 203.5 | 212.7 | 237.6 | 217.9 |
| Avg. HST | 206.3 | 208.2 | 233.6 | 216.0 |

TABLE 17

ASA Sizing Emulsion With Cationic Polymer Mixture 3, After 30 Minutes

| Hand Sheet 3.0 lb ASA | A | B | C | Avg. HST |
|---|---|---|---|---|
| #1 HST | 190.9 | 198.8 | 163.7 | 184.5 |
| #2 HST | 178.2 | 189.4 | 170.0 | 179.2 |
| Avg. HST | 184.6 | 194.1 | 166.9 | 181.8 |

The bar graph in FIG. 1 depicts the results form Tables 6–17. As can be seen in FIG. 1, as the amount of PEI (BUFLOC® 595) is increased, the time it takes for the reflectance of the paper (HST) to drop to 85% of its original value drops. The second set of bars on the graph show the results from a second set of handsets which were made after the emulsion was allowed to sit for 30 minutes. As the average value for the 1.5 lb/ton mixtures of Mix #2, and Mix #3 show, it appeared that the sizing level actually increased after that 30 minute wait. However, as can be seen from Tables 10 and 11 and from Tables 14 and 15, the average times for the handsheets for each of these mixtures showed a great deal of variation. Mix #2, which had a weight average time of 123.3 seconds after 30 minutes, actually ranged from 71.8 to 196.8 seconds. Similar results were seen for Mixture #3, which had a range of 48.6 to 162.4 with a weight average of 98.5 seconds. Based on the results shown above and in FIG. 1, Mixture #1, the 2.5% BUFLOC® 595 mixture, gave more effective sizing.

The invention claimed is:

1. An ASA sizing emulsion comprising:
   25 to 99 percent by weight water,
   0.003 to 60 percent by weight ASA,
   0.003 to 50 percent by weight of a cationic polymer mixture, the mixture comprising 75 to 99 percent by weight of a low molecular weight ionene polymer and 1 to 25 percent by weight of a high molecular weight polyethyleneimine polymer,
   and 0 to 2 percent by weight of a surfactant.

2. An ASA sizing emulsion of claim 1, wherein the low molecular weight ionene polymer has a weight average molecular weight of less than 15,000 and the high molecular weight polyethylenimine polymer has a weight average molecular weight of greater than 500,000.

3. An ASA sizing emulsion of claim 2, wherein the low molecular weight ionene polymer comprises the repeating unit of formula I:

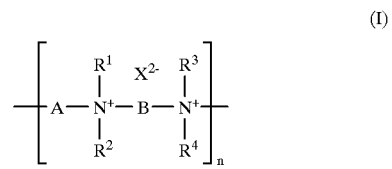

wherein:
$R^1$, $R^2$, $R^3$, and $R^4$ are identical or different, and are selected from H, $C_1-C_{20}$ alkyl optionally substituted with at least one hydroxyl group, and benzyl optionally substituted on the benzene moiety with at least one $C_1-C_{20}$ alkyl group;

A is a divalent radical selected from $C_1-C_{10}$ alkylene, $C_2-C_{10}$ alkenylene, $C_2-C_{10}$ alkynylene, $C_1-C_{10}$ hydroxyalkylene, symmetric or asymmetric di-$C_1-C_{10}$-alkylenether, arylene, arylene-$C_1-C_{10}$-alkylene, or $C_1-C_{10}$-alkylenearyl-$C_1-C_{10}$ alkylene;

B is a divalent radical selected from $C_1-C_{10}$ alkylene, $C_2-C_{10}$ alkenylene, $C_2-C_{10}$ alkynylene, $C_1-C_{10}$ hydroxyalkylene, arylene, arylene-$C_1-C_{10}$-alkylene, or $C_1-C_{10}$-alkylenearyl-$C_1-C_{10}$-alkylene; and $X^{2-}$, is a divalent counter ion, two monovalent counter ions, or a fraction of a polyvalent counter ion sufficient to balance the cationic charge in the repeating unit which forms the ionene polymer backbone and wherein n is present in an amount such that the ionene polymer has a weight average molecular weight of less than 15,000.

4. An ASA sizing emulsion of claim 2, wherein the low molecular weight ionene polymer comprises the repeating unit of formula II:

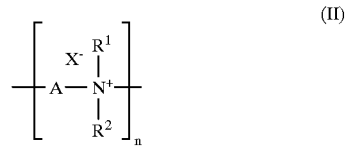

wherein:
$R^1$ and $R^2$ are identical or different, and are selected from H, $C_1-C_{20}$ alkyl optionally substituted with at least one hydroxyl group, and benzyl optionally substituted on the benzene moiety with at least one $C_1-C_{20}$ alkyl group;

A is a divalent radical selected from $C_1-C_{10}$ alkylene, $C_2-C_{10}$ alkenylene, $C_2-C_{10}$ alkynylene, $C_1-C_{10}$ hydroxyalkylene, symmetric or asymmetric di-$C_1-C_{10}$-alkylenether, arylene, arylene-$C_1-C_{10}$-alkylene, or $C_1-C_{10}$-alkylenearyl-$C_1-C_{10}$ alkylene; and $X^-$, is a monovalent counter ion, or a fraction of a polyvalent counter ion sufficient to balance the cationic charge in the repeating unit which forms the ionene polymer backbone and wherein n is present in an amount such that the ionene polymer has a weight average molecular weight of less than 15,000.

5. An ASA sizing emulsion of claim 2, wherein the low molecular weight ionene polymer comprises a repeating unit of formula III:

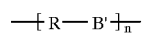

wherein R is

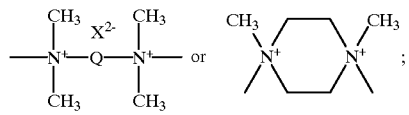

Q is —(CHR')$_p$—, —CH$_2$—CH=CH—CH$_2$—, —CH$_2$—CH$_2$—O—CH$_2$—CH$_2$—, —CH$_2$—CH(OH)—CH$_2$—, or —(CHR')$_{n'}$ NH—C(O)—NH(CHR')$_{n'}$—;

B' is {—[CH$_2$—CH(OH)—CH$_2$—N$^+$R'$_2$—(CHR')$_{n'}$—NH—C(O)—NH]—, X$^-$ } or {—[(CHR')$_n$—N+R'$_2$—CH$_2$—CH(OH)—CH$_2$]—, X$^-$};

n' and p independently vary from 2 to 12;

R' is independently hydrogen or a lower alkyl group;

X$^{2-}$ is a divalent counter ion, two monovalent counter ions, or a fraction of a polyvalent counter ion sufficient to balance the cationic charge in the group R; and X$^-$ is a monovalent counter ion, one half of a divalent counter ion or a fraction of a polyvalent counter ion sufficient to balance the cationic charge in the group B' and wherein n is present in an amount such that the ionene polymer has a weight average molecular weight of less than 15,000.

6. An ASA sizing emulsion of claim 2, wherein the low molecular weight ionene polymer has a weight average molecular weight of less than 10,000 and the high molecular weight polyethylenimine polymer has a weight average molecular weight of greater than 1,000,000.

7. An ASA sizing emulsion of claim 6, wherein the low molecular weight ionene polymer has a charge density of greater than 5 meq/g at pH 7 and the high molecular weight polyethylenimine polymer has a charge density of about 5 meq/g at pH 7.

8. An ASA sizing emulsion of claim 1, wherein the low molecular weight ionene polymer is the reaction product of epichlorohydrin and dimethylamine and the high molecular weight polyethylenimine polymer is crosslinked with ethylene oxide.

9. An ASA sizing emulsion of claim 1, wherein the surfactant is an anionic surfactant.

10. An ASA sizing emulsion of claim 2, wherein the ASA has a particle size ranging from 0.5 to 3 microns.

11. An ASA sizing emulsion of claim 1, wherein the ASA has a particle size ranging from 0.5 to 3 microns.

12. A method for sizing paper comprising the steps of contacting a pulp slurry with an ASA sizing emulsion of claim 2, and forming the pulp into a paper sheet.

13. A method for sizing paper comprising the steps of contacting a pulp slurry with an ASA sizing emulsion of claim 1, and forming the pulp into a paper sheet.

14. An ASA sizing emulsion comprising:
25 to 99 percent by weight water,
0.003 to 60 percent by weight ASA,
0.003 to 50 percent by weight of an ionene polymer having a weight average molecular weight of less than 10,000,
up to 12.5 percent by weight polyethyleneimine, and
0 to 2 percent by weight of a surfactant.

15. An ASA sizing emulsion of claim 14, wherein the low molecular weight ionene polymer comprises the repeating unit of formula I:

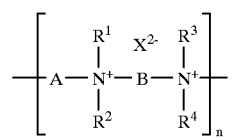

wherein:
R$^1$, R$^2$, R$^3$, and R$^4$ are identical or different, and are selected from H, C$_1$–C$_{20}$ alkyl optionally substituted with at least one hydroxyl group, and benzyl optionally substituted on the benzene moiety with at least one C$_1$–C$_{20}$ alkyl group;

A is a divalent radical selected from C$_1$–C$_{10}$ alkylene, C$_2$–C$_{10}$ alkenylene, C$_2$–C$_{10}$ alkynylene, C$_1$–C$_{10}$ hydroxyalkylene, symmetric or asymmetric di-C$_1$–C$_{10}$-alkylenether, arylene, arylene-C$_1$–C$_{10}$-alkylene, or C$_1$–C$_{10}$-alkylenearyl-C$_1$–C$_{10}$ alkylene;

B is a divalent radical selected from C$_1$–C$_{10}$ alkylene, C$_2$–C$_{10}$ alkenylene, C$_2$–C$_{10}$ alkynylene, C$_1$–C$_{10}$ hydroxyalkylene, arylene, arylene-C$_1$–C$_{10}$-alkylene, or C$_1$–C$_{10}$-alkylenearyl-C$_1$–C$_{10}$-alkylene; and X$^{2-}$, is a divalent counter ion, two monovalent counter ions, or a fraction of a polyvalent counter ion sufficient to balance the cationic charge in the repeating unit which forms the ionene polymer backbone and wherein n is present in an amount such that the ionene polymer has a weight average molecular weight of less than 10,000.

16. An ASA sizing emulsion of claim 14, wherein the low molecular weight ionene polymer comprises the repeating unit of formula II:

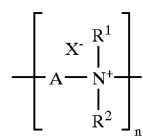

wherein:
R$^1$ and R$^2$ are identical or different, and are selected from H, C$_1$–C$_{20}$ alkyl optionally substituted with at least one hydroxyl group, and benzyl optionally substituted on the benzene moiety with at least one C$_1$–C$_{20}$ alkyl group;

A is a divalent radical selected from C$_1$–C$_{10}$ alkylene, C$_2$–C$_{10}$ alkenylene, C$_2$–C$_{10}$ alkynylene, C$_1$–C$_{10}$ hydroxyalkylene, symmetric or asymmetric di-C$_1$–C$_{10}$-alkylenether, arylene, arylene-C$_1$–C$_{10}$-alkylene, or C$_1$–C$_{10}$-alkylenearyl-C$_1$–C$_{10}$ alkylene; and X$^-$, is a monovalent counter ion, or a fraction of a polyvalent counter ion sufficient to balance the cationic charge in the repeating unit which forms the ionene polymer backbone and wherein n is present in an amount such that the ionene polymer has a weight average molecular weight of less than 10,000.

17. An ASA sizing emulsion of claim 16, wherein R$^1$ and R$^2$ are each methyl, A is —CH$_2$CH(OH)CH$_2$—, X$^-$ is Cl$^-$ and wherein n is present in an amount such that the ionene polymer has a weight average molecular weight ranging from 5,000 to less than 10,000.

18. An ASA sizing emulsion of claim 17, wherein the surfactant is a nonionic surfactant.

19. An ASA sizing emulsion of claim 14, wherein the low molecular weight ionene polymer comprises a repeating unit of formula III:

(III)

wherein R is

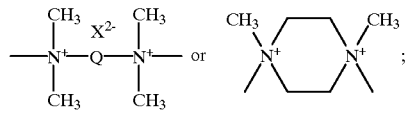

Q is $-(CHR')_p-$, $-CH_2-CH=CH-CH_2-$, $-CH_2-CH_2-O-CH_2-CH_2-$, $-CH_2-CH(OH)-CH_2-$, or $-(CHR')_{n'}\ NH-C(O)-NH(CHR')_{n'}-$;

B' is $\{-[CH_2-CH(OH)-CH_2-N^+R'_2-(CHR')_{n'}-NH-C(O)-NH]-,\ X^-\}$ or $\{-[(CHR')_{n'}-N^+R'_2-CH_2-CH(OH)-CH_2]-,\ X^-\}$;

n' and p independently vary from 2 to 12;

R' is independently hydrogen or a lower alkyl group;

$X^{2-}$ is a divalent counter ion, two monovalent counter ions, or a fraction of a polyvalent counter ion sufficient to balance the cationic charge in the group R; and $X^-$ is a monovalent counter ion, one half of a divalent counter ion or a fraction of a polyvalent counter ion sufficient to balance the cationic charge in the group B' and wherein n is present in an amount such that the ionene polymer has a weight average molecular weight of less than 10,000.

20. An ASA sizing emulsion of claim 14, wherein the polyethyleneimine is present in an amount of from 0.5 to 12.5 percent by weight.

21. An ASA sizing emulsion of claim 14, wherein the surfactant is a nonionic surfactant.

* * * * *